United States Patent [19]
Yamamoto et al.

[11] Patent Number: 5,186,689
[45] Date of Patent: Feb. 16, 1993

[54] AUTOTENSIONER

[75] Inventors: Ken Yamamoto; Kazufumi Nakagawa; Isao Hori, all of Iwata, Japan

[73] Assignee: NTN Corporation, Osaka, Japan

[21] Appl. No.: 828,361

[22] Filed: Jan. 30, 1992

[51] Int. Cl.[5] .............................................. F16H 7/08
[52] U.S. Cl. ..................................... 474/112; 474/117
[58] Field of Search ............... 474/101, 109, 112, 113, 474/117, 133, 135, 138

[30] Foreign Application Priority Data

Jan. 31, 1991 [JP] Japan .................................. 3-2773

[56] References Cited
U.S. PATENT DOCUMENTS 4,832,665 5/1989 Kadota et al. ...................... 474/112
4,917,655 4/1990 Martin ................................. 474/112

Primary Examiner—Thuy M. Bui
Attorney, Agent, or Firm—Wenderoth, Lind & Ponack

[57] ABSTRACT

An autotensioner for a belt has a pulley support shaft secured to a base and an eccentric ring rotatably supported by the pulley support shaft with its center offset from the center of the pulley support shaft. A pulley is rotatably supported around the eccentric shaft through a rolling bearing. A spring for biasing the eccentric ring is provided to press the pulley against the belt. A damper for imparting resistance to rotation to the eccentric ring is provided to restrain the pivoting motion of the pulley. The resistance to rotation is imparted to the eccentric ring by the damper at the side of the rolling bearing opposite to the base.

2 Claims, 4 Drawing Sheets

AUTOTENSIONER

BACKGROUND OF THE INVENTION

This invention relates to an autotensioner for keeping constant the tension of a belt such as a belt for driving camshafts of an automotive engine.

As shown in FIGS. 6 and 7, a belt transmission device for driving the camshafts comprises a pulley 51 mounted on a crankshaft 50, pulleys 53 mounted on camshafts 52, and an endless timing belt 54 extending around the pulleys 51 and 53. An autotensioner X is provided on the side toward which the belt tends to slacken, to keep the tension of the belt 54 constant.

This type of autotensioner is disclosed in Unexamined Japanese Utility Model Publication 1-171952, which has a damper mounted in a pulley support rotatably supporting a pulley to provide resistance to rotation to the pulley support.

The autotensioner having a damper can restrain the pulley from moving excessively toward the slack side together with the pulley support by imparting resistance to the pulley support. This serves to reduce the vibration of the belt.

In this conventional autotensioner, the damper is disposed between the engine block and a rolling bearing which is provided between the pulley support and the pulley. Thus, the distance from the engine block to the center of the pulley is rather larger, so that the timing belt 54 shown in FIG. 7 is located apart from an engine block 55. This will reduce the rigidity of the crankshaft 50 and the camshafts 52.

SUMMARY OF THE INVENTION

An object of this invention is to reduce the distance from a base such as an engine block to the center of a pulley of an autotensioner.

According to the present invention, there is provided a belt autotensioner comprising a pulley support shaft secured to a base, an eccentric ring rotatably supported on the pulley support shaft at an offset position, a pulley for the belt rotatably supported on the eccentric ring through a rolling bearing, a biasing means for biasing the eccentric ring to press the pulley against the belt, and a damper for imparting resistance to rotation to the eccentric ring to restrain the pivoting motion of the pulley, characterized in that the resistance to rotation is imparted to the eccentric ring by the damper at the side of the rolling bearing opposite to the base.

Since the damper imparts resistance to rotation to the eccentric ring at the side of the rolling bearing opposite to the base, the pulley can be mounted nearer to the base. Thus, the distance from the base to the center of the pulley can be relatively small. Thus, the rigidity of the crankshaft and the camshafts can be increased.

Other features and objects of the present invention will become apparent from the following description taken with reference to the accompanying drawings, in which:

DETAILED DESCRIPTION OF THE PREFERRED EMBODIMENTS

Figure 1:
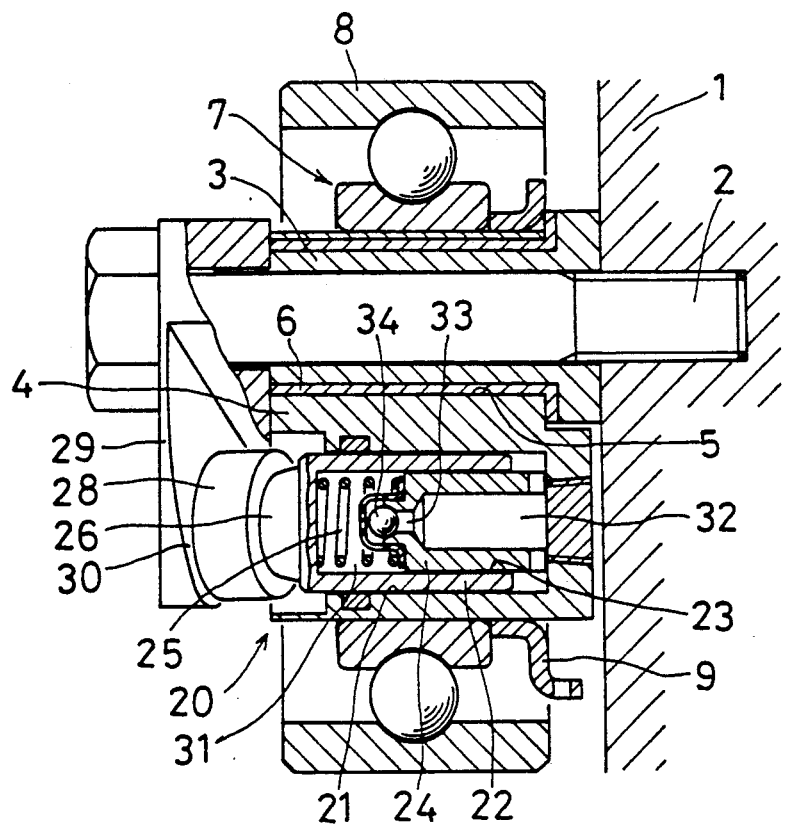
FIG. 1 is a vertical sectional front view of the first embodiment of the autotensioner according to this invention.

FIGS. 1-4 show the first embodiment. In the figures, a bolt 2 is threaded into an engine block 1 serving as a base. A cylindrical pulley support shaft 3 is fitted around the bolt 2 and is fixedly mounted to the engine block 1 by tightening the bolt 2.

An eccentric ring 4 is provided around the pulley support shaft 3 and is formed with a hole 5 to receive the pulley support shaft 3 so as to be located offset with respect to its center. A bearing 6 it interposed between the hole 5 and the pulley support shaft 3.

Around the eccentric ring 4, a pulley 8 is rotatably supported through a rolling bearing 7. A tension arm 9 is secured to one end of the eccentric ring 4 opposite to the engine block 1. A tension adjusting spring 10 is coupled to the tip of the tension arm 9.

Figure 2:
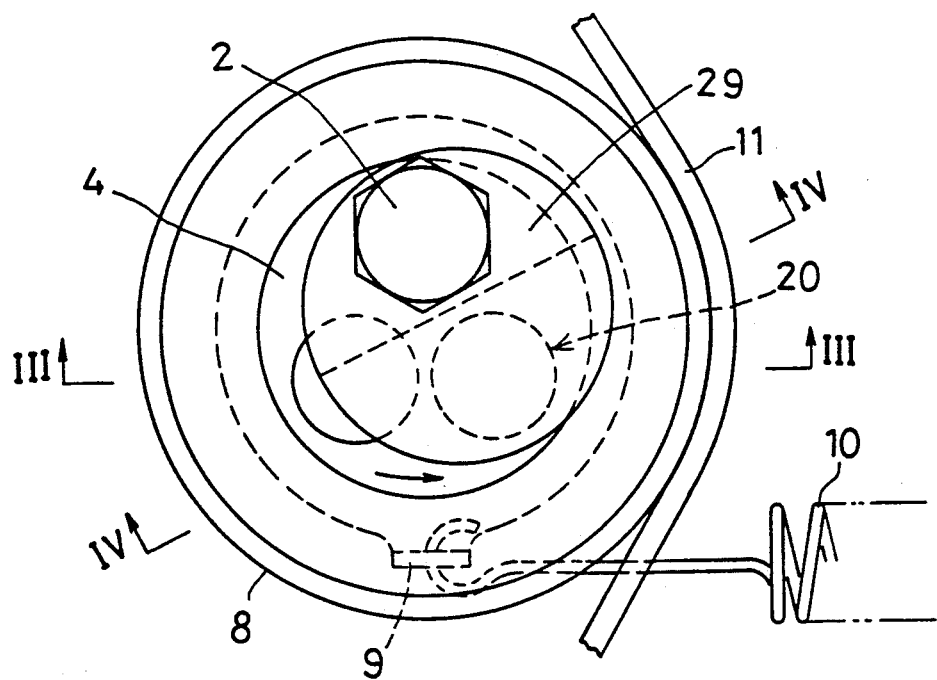
FIG. 2 is a side view of the same.

The tension adjusting spring 10 biases the eccentric ring 4 in the direction of the arrow in FIG. 2, thus pressing the pulley 8 against a belt 11.

Resistance to rotation is applied to the eccentric ring by a damper 20. This resistance to rotation serves to reduce the vibration of the belt 11, thus preventing the pulley 8 from pivoting excessively about the pulley support shaft 3 in such a direction that the belt 11 slackens.

Figure 3:
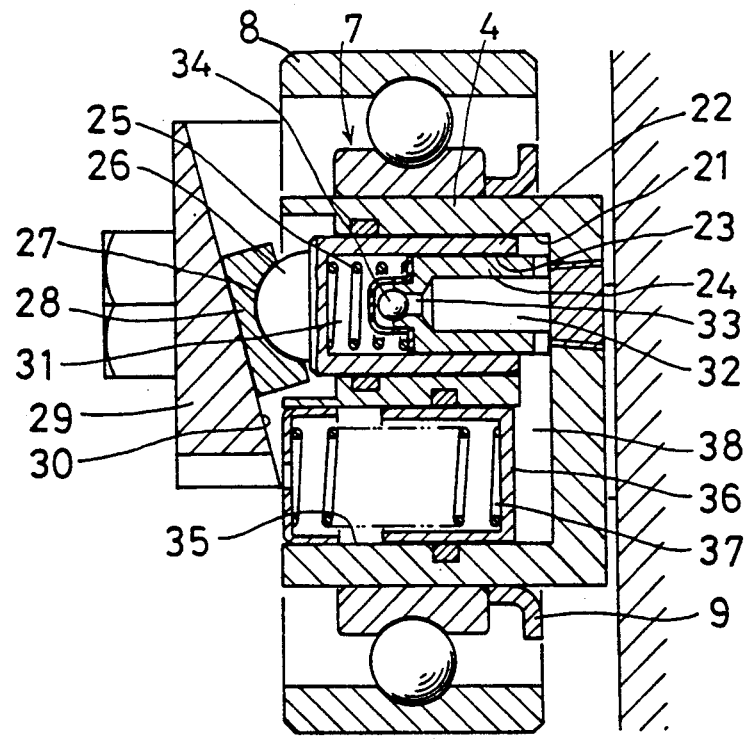
FIG. 3 is a sectional view taken along line III—III of FIG. 2.
Figure 4:
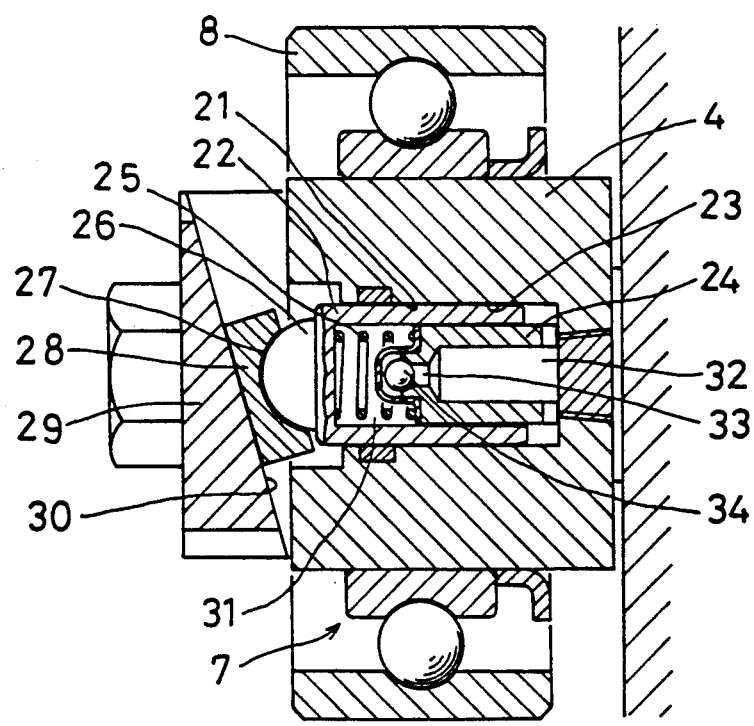
FIG. 4 is a sectional view taken along line IV—IV of FIG. 2.

As shown in FIG. 3, the eccentric ring 4 is formed with a first cylinder chamber 21 open at the end of the ring 4 remote from the engine block 1. A plunger 22 slidably mounted in the first cylinder chamber 21 is formed in the rear end thereof with an axial hole 23 in which a piston 24 and a spring 25 are mounted. The spring 25 serves to press the piston 24 against the bottom of the first cylinder chamber 21 and to urge the plunger 22 outwardly.

The plunger 22 is provided at its tip with a spherical protrusion 26. A slide member 28 is in sliding contact with the outer spherical surface of the spherical protrusion 26 and is pressed by the spring 25 against an inclined cam surface 30 of a cam member 29 secured to the tip of the pulley support shaft 3.

A pressure chamber 31 is defined in the plunger 22 by the piston 24 mounted therein. It communicates with a reservoir chamber 32 formed in the piston 24 through a passage 33 formed in the piston 24. A check valve 34 is provided at the tip of the passage 33 to open and close the passage.

The eccentric ring 4 is formed with a second cylinder chamber 35 in which a piston 36 and a spring 37 are mounted. A piston rear chamber 38 defined by the piston 36 communicates with the reservoir chamber 32 to accommodate for any change in the volume of the hydraulic oil sealed in the pressure chamber 31, the reservoir chamber 32 and the piston rear chamber 38 when the piston 36 moves.

By the contact resistance between the inclined cam surface 30 and the slide member 28, a resistance to rotation is applied to the eccentric ring 4. This resistance to rotation serves to reduce the vibration of the belt 11 and thus to prevent the pulley 8 from pivoting excessively about the pulley support shaft 3 in such a direction that the belt slackens.

With this damper 20, when the belt 11 slackens and the eccentric ring 4 is turned by the force of the tension adjusting spring 10, the pulley 8 will pivot about the pulley support shaft 3 in such a direction as to stretch the belt 8 taut and to cause the slide member 28 to slide along the inclined cam surface 30 toward its lower part. At the same time, the plunger 22 is advanced by the force of the spring 25 and the passage 33 is opened by the check valve 34, allowing the hydraulic oil in the reservoir chamber 32 to flow into the pressure chamber 31. Thus, the plunger 22 can move smoothly outward, so that the pulley 8 can move quickly in such a direction as to stretch the belt 11 taut.

On the other hand, when the tension of the belt 11 increases and the pulley 8 is pushed by the belt in a direction to slacken the belt, the eccentric ring 4 will turn and the slide member 28 will slide along the inclined cam surface toward its upper part. At the same time, the plunger 22 is pushed toward the first cylinder chamber 21 and the passage 33 is closed by the check valve 34, so that the hydraulic oil in the pressure chamber 31 will be subjected to high pressure and leak through a gap between the slidingly engaged surfaces of the plunger 22 and the piston 24 so as to flow into the reservoir chamber 32.

Thus, the plunger 22 moves backward at a low speed. Thus, the pulley 8 will pivot slowly in such a direction as to slacken the belt 11.

According to this invention, resistance to rotation is imparted to the eccentric ring 4 by the damper 20 at a location more remote from the engine block 1 than the rolling bearing 7. Thus, the pulley 8 can be mounted near the engine block 1. This makes it possible to reduce the distance h from the engine block 1 to the center of the pulley 8.

Figure 5:
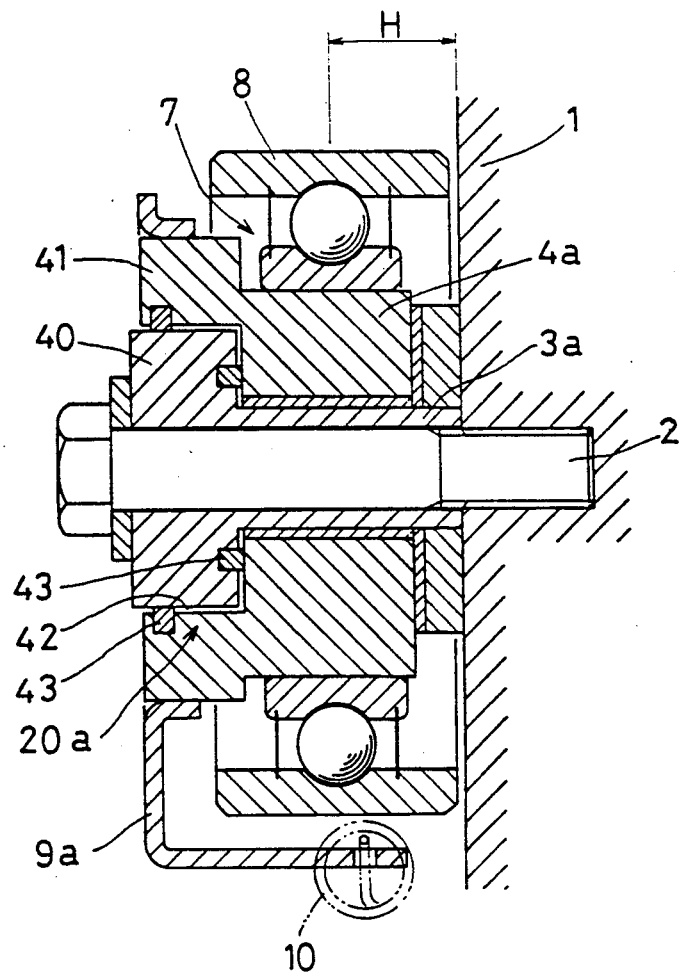
FIG. 5 is a vertical sectional front view of a second embodiment.
Figure 6:
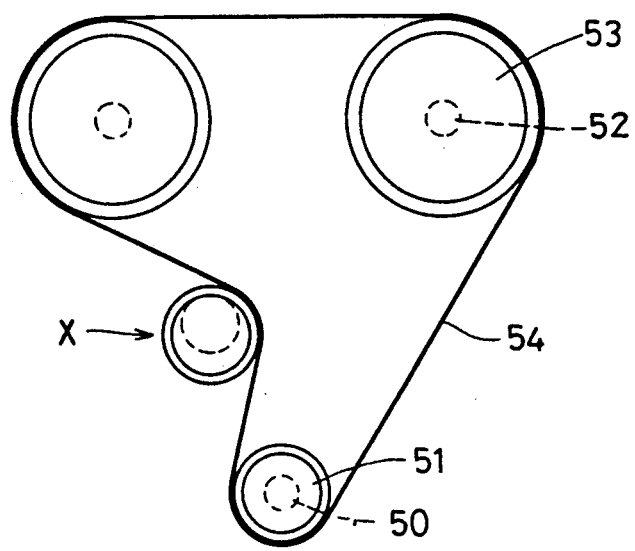
FIG. 6 is a belt transmission device having an autotensioner.
Figure 7:
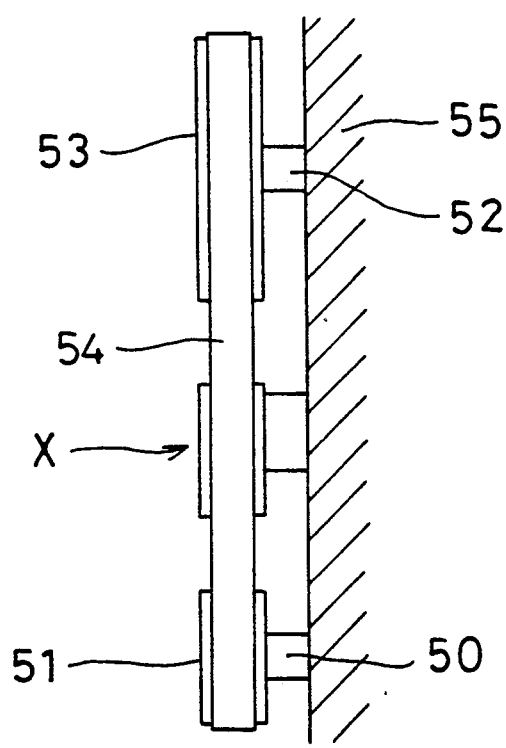
FIG. 7 is a side view of the same.

FIG. 5 shows the second embodiment of the autotensioner according to this invention. In this embodiment, a pulley support shaft 3a, which is secured to the engine block 1 by tightening the bolt 2, has a large-diameter shank 40 at its tip. An eccentric ring 4a is rotatably supported on a pulley support shaft 3a and has a cylindrical portion 41 around the large-diameter shank 40. A damper 20a is provided between the cylindrical portion 41 and the large-diameter shank 40.

A gap 42 formed between the large-diameter shank 40 and the cylindrical portion 41 is sealed by a pair of seals 43. The sealed gap 42 is filled with a viscous fluid. The viscosity of the fluid offers a resistance to the rotation of the eccentric ring 4a.

In the second embodiment, too, the resistance to rotation is imparted to the eccentric ring 4a at a location more remote from the engine block 1 than the bearing 7. Thus, the pulley 8 can be mounted near the engine block 1, so that the distance H from the engine block 1 to the center of the pulley 8 can be reduced.

In the second embodiment, a tension arm 9a has one end thereof secured to the cylindrical portion 41 of the eccentric ring 4a and the other end thereof coupled to the tension adjusting spring 10 to impart a rotating force to the eccentric ring 4a.

What is claimed is:

1. A belt autotensioner comprising a pulley support shaft secured to a base, an eccentric ring rotatably supported on said pulley support shaft at an offset position, a pulley rotatably supported on said eccentric ring through a rolling bearing, biasing means for biasing said eccentric ring in a belt pressing direction, and a damper imparting resistance to rotation to said eccentric ring at the side of said rolling bearing opposite to said base to thereby restrain said pulley from pivoting about said support shaft.

2. A belt autotensioner as claimed in claim 1 and further comprising a tension arm having one end thereof secured to said eccentric ring at the side of said rolling bearing remote from said base, said biasing means being coupled to said tension arm to impart a rotating force to said eccentric ring.

* * * * *